Patented Nov. 4, 1941

2,261,227

UNITED STATES PATENT OFFICE 2,261,227

COMPRESSION IGNITION ENGINE FUELS

Gould H. Cloud, Elizabeth, N. J., assignor to Standard Oil Development Company, a corporation of Delaware No Drawing. Application April 21, 1939, Serial No. 269,074

4 Claims. (Cl. 44—9)

This invention relates particularly to fuel compositions adapted for high speed engines of the Diesel type requiring certain qualities in the fuel for proper liquid injection and undelayed ignition.

Certain addition agents have been proposed in this art for shortening the delay period between the injection of the fuel oil into the combustion zone of a Diesel engine and the point at which ignition induced through compression sets in. Also, some materials have been recommended for improving the performance of fuels by improving various physical characteristics of the fuel, since proper timing of combustion for injection type engines is largely dependent upon a proper atomization of the fuel in correct amounts into the engine combustion chambers at regular intervals. Many addition compounds act as ignition accelerators on account of their thermal instability which has been generally recognized as belonging to unstable groupings characteristically formed by oxygen with nitrogen, as in nitrate radicals. Yet, owing to this instability, these same types of compounds tend to deteriorate during storage, inducing oxidation of hydrocarbons in the fuel, and developing corrosive decomposition products in storage or while undergoing combustion. Other blending agents proposed for improving the stability and physical characteristics of oil on the other hand have been prejudical to the ignition quality of the fuel.

An object of this invention is to provide a Diesel fuel composition with a novel stabilizing agent which, added to a hydrocarbon Diesel oil by itself or in combination with unstable though extremely potent types of ignition accelerators, has a substantially beneficial influence on the ignition quality of the fuel while functioning to prevent sludge or sediment formation and to increase the fuel injection efficiency generally.

Other more detailed objects of this invention will become apparent from the following description.

Compounds suitable for use as stabilizing ignition promoters of Diesel fuel are certain organic phosphites which have proved to have properties essential for the object of this invention.

The major class of compounds referred to as organic phosphites is identified by the general phosphite ester formula: $(RO)_3P$, in which a sulphur atom may be substituted for each oxygen atom and R represent organic groups consisting essentially of hydrogen and carbon, as in alkyl, alkaryl, and aralkyl groups. The alkyl groups are, for example, methyl or ethyl groups, but preferably high homologous groups such as propyl, amyl, their isomers or cyclo aliphatic analogues. Examples of alkaryl and aralkyl groups are cresyl and benzyl groups. The presence of inorganic constituents such as chloro, amino, and nitrate groups or associated metallo organic groups may be used to modify their effects. Phosphite esters found to be particularly useful for the practice of this invention are the thiophosphites containing alkyl groups.

The trialkyl thiophosphites are colorless oils with characteristic odors, are insoluble in water but readily soluble in hydrocarbon oils. They are stable in the presence of water. They do not decompose in air below 90° C. They may be oxidized by strong oxidizing agents to corresponding phosphates.

To obtain phosphite esters the reaction commonly used is $3ROH + PX_3 = (RO)_3P + 3HX$, X representing a halogen, usually chlorine. Similarly, to obtain the preferred thiophosphites the same reaction is used with simply a substitution of a thioalcohol, i. e., a mercaptan, for the reactant ROH. Details of the procedure are given in the following illustrations.

To 33 grams of amyl mercaptan mixed with 24 grams of dimethyl aniline in 100 cc. of ether in a flask fitted with a reflux condenser and a mercury field stirrer, 13.7 grams of phosphorus dichloride are added slowly with stirring. The reaction mixture is refluxed at 70° C. After the reaction is completed dimethyl-aniline-hydrogen chloride is filtered off and extracted with ether. Ether is evaporated from the combined extract and filtrate to leave the triamyl trithiophosphite product.

The esterification may be carried out with other nitrogen bases or by using the higher boiling solvents, such as dichloroethane, at higher temperatures. Other mercaptans e. g., of ethyl, propyl, etc., are similarly reacted.

The manner of employing and testing the organic phosphites for their ignition promoting and stabilizing properties is illustrated in the following description.

A number of samples were prepared by dissolving from a fraction of 1% to about 3% by volume of the compound to be tested in a portion of a 40 cetane number Colombian Diesel oil. Each sample was tested in a C.F.R. type Diesel engine according to the methods disclosed in the S. A. E. Journal of June 1936, page 225. By this test the ignition quality improvement imparted by the addition compound is rated in terms of cetane numbers obtained.

The cetane number of a fuel is the percent by volume of normal cetane in a blend consisting of normal cetane and alphamethyl naphthalene which gives comparable performance in the test engine, and since the ignition lag of such a blend is shortened nearly in proportion to the increase in the volume percentage of the cetane, the cetane number change of a fuel is a measure of its ignition quality improvement when the cetane number change is positive.

From pertinent experimental data on the organic phosphites, the trialkyl thiophosphites were found to be definitely superior to other phosphite esters for the purposes of this invention. Next in order of effectiveness, other alkyl phosphites were found to increase the cetane number of the Diesel fuel on the order of two or more points when dissolved in the fuel in concentrations of less than about 1% by volume.

Triaryl phosphites to the contrary showed an adverse effect on the fuel, especially in comparison with the trialkyl thiophosphite, as is shown by the following tabulated results from comparative tests on samples of a hydrocarbon Diesel fuel modified by different addition compounds:

| Modifying agent in a 40 cetane number Colombian gas oil | Weight per cent of modifying agent used | Cetane number increase |
| --- | --- | --- |
| Triamyl trithiophosphite | 3 | +5 |
| Phosphites of wax alcohols (aliphatic alcohols) | 1 | +1 to +2 |
| Tri (trimethyl benzyl ammonium) phosphite | <1.0 | +2 |
| Triphenyl phosphite | 3 | −3 |

Further tests on fuel samples blended with mixed ignition promoters show that by using the compound capable of promoting and stabilizing ignition qualities of the fuel together with addition compounds having higher potency for accelerating ignition but lacking stability, the ignition qualities of the blended fuel are increased at least in proportion to the effect of each promoter. Considerable importance is attached to this fact because ignition promoters are costly in comparison to the value of hydrocarbon fuel, making it highly desirable to eliminate any detrimental influence of promoters without impairing their ignition accelerating action.

To prepare Diesel fuel compositions which can be stored for long periods without detriment to their ignition quality, also with reduced acid and sludge formation, the ignition promoting stabilizing compound may be used in proportions less than about 1%, whether used alone or with ½% to 5% of addition compounds such as aromatic peroxides, aliphatic nitrates, aliphatic nitrites, aliphatic polysulfides, and similar potent ignition accelerating agents. A fraction of one per cent to about 1% of the stabilizing promoter is generally adequate, but with more readily oxidizable fuels or with more unstable addition compounds, as much as 3% or more may be used.

Every hydrocarbon oil suitable as a fuel for a Diesel engine may be improved in the described manner. Ordinarily the hydrocarbon fuel to be used may be said to have a boiling range above that of gasoline, and more particularly a boiling range and viscosity of hydrocarbons present in a gas oil cut which boils within the range of 400° F. to 700° F. Considerable benefits are obtained in improving lower cost fuels by the stabilizing promoters in that the lower cost fuels contain large quantities of hydrocarbon unstable toward oxidation. Thus small quantities of these promoters are useful for adapting various mixtures of hydrocarbons for use as Diesel fuel, including recycle stock from cracking operations, non-paraffinic extracts, distillates from the destructive distillations of coal and asphaltic material, and mixtures of these with one another or with crude petroleum fractions.

By favoring lubricating qualities of the fuel, the new and preferred type of ignition agents described are valuably employed with light gas oil cuts having A. P. I. gravities above 30° and viscosities in the range of about 30 to 40 Saybolt seconds at 100° F., particularly those which have been chemically refined for the removal of aromatic and asphaltic compounds. Narrow boiling range cuts having a 10% distillation point between 475° F. and 530° F., and a 90% distillation point between 600° F. and 675° F. exhibit in common superior ignition qualities regardless of the crude source provided their aniline miscibility points are substantially above 140 F. and to impart this property of aniline miscibility to the oil may require an amount of chemical refining which tends to remove oiliness and oxidation inhibiting components. To derive full benefits of high ignition quality from these improved narrow fractions, it is important to provide them with an agent which is highly effective for imparting the desired lubricity without detriment to their ignition qualities, or better yet, more highly effective agents such as the trialkyl thiophosphite capable of enhancing their ignition qualities. Blended with agents of this type the less viscous oils are improved more than gas oil fractions of wider boiling range and thus can supply fuels having cetane numbers exceeding 60.

Other agents for enhancing various other physical and chemical qualities of the fuel without detracting substantially from the ignition qualities of the fuel may be admixed, such as dye and pour point depressants.

Practical advantages obtained in using stabilizing promoters as described are:

1. Economy in the use of more potent ignition promoters which are subject to degradation when used without a stabilizing agent;
2. Protection of storage tanks and engine parts from corrosive decomposition products of the more potent ignition promoters;
3. Stabilization of the fuel against the development of insoluble gum resins which tend to clog fuel lines and atomizers;
4. Improved lubrication of pump mechanisms and valves;
5. Improved regulation of atomization of the fuel into the combustion zone;
6. Reduced ring sticking when fuel is sprayed on cylinder walls during starting or idling operation.

The above description and examples are to be taken as illustrative only and not as limiting the scope of the invention. Any modification or variation therefrom which conforms with the spirit of this invention is intended to be included within the scope of the claims.

I claim:

1. A fuel composition for composition for compression ignition engines of the Diesel type comprising a hydrocarbon Diesel fuel blended with a phosphite ester of a compound selected from the group consisting of hydroxyl alcohols and thioalcohols, said ester containing three organic groups, each of which has an alkyl group, the hydrocarbon components of said fuel composition boiling below 700° F. and the said ester being added in sufficient amount to substantially enhance the ignition quality of said fuel.

2. A fuel composition according to claim 1 in which the added ester is a trialkyl trithiophosphite.

3. A fuel composition according to claim 1 in which the added ester is triamyl trithiophosphite.

4. A fuel composition for compression ignition engines of the Diesel type comprising a hydrocarbon Diesel fuel blended with a sufficient amount of a trialkyl trithiophosphite to substantially enhance the ignition quality of said fuel, the hydrocarbon component of said fuel composition having a boiling range of 400° to 700° F., A. P. I. gravity above 30° and a viscosity of 30 to 40 seconds Saybolt at 100 F.

GOULD H. CLOUD.